(12) United States Patent
Cottis

(10) Patent No.: US 6,861,463 B2
(45) Date of Patent: Mar. 1, 2005

(54) LIQUID CRYSTALLINE POLYMER COMPOSITIONS CONTAINING SMALL PARTICLE SIZE FILLERS

(75) Inventor: Steve G. Cottis, West Windsor, NJ (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/464,316

(22) Filed: Jun. 17, 2003

(65) Prior Publication Data

US 2003/0212187 A1 Nov. 13, 2003

Related U.S. Application Data

(63) Continuation of application No. 09/760,940, filed on Jan. 16, 2001, now abandoned.
(60) Provisional application No. 60/175,953, filed on Jan. 13, 2000.

(51) Int. Cl.[7] .................................................. C08K 3/34
(52) U.S. Cl. ..................... 524/493; 524/497; 252/299.1
(58) Field of Search ................................. 524/430, 423, 524/493, 497; 252/299.1

(56) References Cited

U.S. PATENT DOCUMENTS

| 4,851,503 A | 7/1989 | Matsumoto et al. |
| 5,529,716 A | 6/1996 | Momura et al. |
| 6,121,369 A | 9/2000 | Stacks et al. |

FOREIGN PATENT DOCUMENTS

| WO | WO 98/28380 A1 | 7/1998 |
| WO | WO 00/40655 | 7/2000 |
| WO | WO 01/04196 A1 | 1/2001 |
| WO | WO 01/51555 A1 | 7/2001 |

OTHER PUBLICATIONS

Patent Abstracts of Japan, Publication No. 06–107816, Apr. 19, 1994, Toray Ind. Inc., Nakajima Shoji et al.

*Primary Examiner*—Katarzyna Wyrozebski

(57) ABSTRACT

Compositions comprising liquid crystalline polymer; inert filler; and small particle size filler having a mean particle size less than about 50 nanometers. These blends have excellent adhesion and low surface roughness properties and can be used as molded articles in electronics or electrical applications.

8 Claims, No Drawings

LIQUID CRYSTALLINE POLYMER COMPOSITIONS CONTAINING SMALL PARTICLE SIZE FILLERS

CROSS REFERENCE TO RELATED APPLICATIONS

This application is a continuation of U.S. patent application Ser. No. 09/760,940, filed Jan. 16, 2001, now abandoned, which claims the benefit of U.S. Provisional Application No. 60/175,953, filed Jan. 13, 2000.

FIELD OF INVENTION

This invention relates to thermotropic liquid crystalline polymer blends containing inert fillers and small particle size fillers, and in particular, relates to such blends having improved adhesion and low surface roughness properties.

BACKGROUND OF INVENTION

Thermotropic liquid crystalline polymers (LCPs) have become important items of commerce, being useful as molding resins for general purpose uses, and more specifically in the electrical and electronics industries due to their thermal stability, chemical resistance, and other desirable properties.

For many electrical and electronics applications, LCP molding resins should in particular exhibit properties such as good adhesion and low surface roughness. Such applications include chip carriers, printed circuit boards, integrated circuits, encapsulated chips, and surface mount components, to name a few.

Injection molded specimens and extrudates of LCP compositions consist of skin surfaces, inner skin layers, and unoriented cores. See, e.g., "The Structure of Thermotropic Copolyesters", Linda C. Sawyer and Michael Jaffe, Journal of Material Science 21, 1897–1913 (1986). The skin surfaces can be separated from the inner skin layers with little force. Thus, in a metallized surface, even though the metal plating can adhere to the skin surface to form a metallized layer, one is still faced with the weak bonding between this metallized layer and the inner skin layers, resulting in failure of the metallized surface under stress. Glass reinforcement has aided greatly in reducing this effect. However, glass fibers give rise to rough surfaces, which are undesirable and unsuitable in most electronic applications.

SUMMARY OF INVENTION

This invention includes compositions comprising liquid crystalline polymer; inert filler; and small particle size filler having a mean particle size less than about 50 nanometers. Also included are molded articles comprising compositions of this invention, including applications in electronic and electrical apparatus. Other aspects and embodiments of this invention will be better understood in view of the following detailed description of preferred embodiments.

DETAILED DESCRIPTION OF PREFERRED EMBODIMENTS

Compositions according to this invention comprise an LCP component; an inert filler component; and a small particle size filler component. Optional components include conventional additives. Also included are articles molded from such compositions. Preferably, compositions of this invention exhibit excellent adhesion, e.g., to metallized surfaces, as well as low surface roughness properties.

LCP Component

Thermotropic liquid crystalline polymers (LCPs) are known in the art by various terms, including "liquid crystal" and "anisotropic melts." A polymer is optically anisotropic if, in the melt phase, it transmits light when examined between crossed polarizers using a polarizing microscope. By "thermotropic" is meant that the polymer may be melted and then re-solidified, i.e. is thermoplastic.

The LCP polymers useful herein include thermotropic liquid crystalline polyesters and liquid crystalline poly(ester-amides), poly(ester-imide), poly(ester-amide-imide), or mixtures thereof. These terms have their usual meaning, and simply indicate that the repeat units in the polymer are joined by ester and optionally amide and/or imide linkages. Preferred polymers are liquid crystalline polyesters, and it is further preferred that these polyesters be aromatic polyesters. By "aromatic" is meant that, except for the carbon atoms contained in functional groups such as ester, amide or imide, all of the carbon atoms in the main chain of the polymer are present in aromatic rings such as phenylene, naphthylylene, biphenylene, etc. Carbon atoms in other types of groupings such as alkyl may be present as substituents on the aromatic rings, as in a repeat unit derived from methylhydroquinone or 2-t-butyl-4-hydroxybenzoic acid, and/or also present at other places in the polymer such as in n-alkyl amides. Other substituent groups such as halogen, ether, and aryl may also be present in the LCP.

As the components of the wholly aromatic polyester used in the LCP compositions of the present invention, there may be used for example: i) hydroquinone; ii) 4,4'-dihydroxybiphenyl(4,4'-biphenol); iii) isopthalic acid; iv) terephthalic acid; v) p-hydroxybenzoic acid or its derivatives; vi) 4,4'-dihydroxybiphenyl (4,4'-bibenzoic acid) or its derivatives; viii) 2,6-naphthalenedicarboxylic acid; iv) 6-hydroxy-2-naphthoic acid, or combinations thereof. These components are all known in the art and are commercially available or can be prepared by techniques readily available to those in the art. Of the combinations of these components, a combination of hydroquinone, 4,4'-dihydroxybiphenyl, terephthalic acid, 4-hydroxybenzoic acid, and 2,6-naphthalenedicarboxylic acid, is preferred. Also preferred are LCP compositions that have a melting point greater than about 330° C.

The LCP component preferably comprises one or more LCP compositions, in an amount between about 40 and about 85 weight percent of the composition, more preferably between about 50 and about 80 weight percent of the composition, and even more preferably between about 60 and about 75 weight percent of the composition.

Inert Filler Component

The inert filler component comprises preferably between about 15 and about 55 weight percent of the composition (or between about 10 and about 50 volume percent of the composition), more preferably between about 20 and about 45 weight percent of the composition, and even more preferably, between about 25 and about 35 weight percent of the composition. The inert filler component may comprise one or more inert fillers.

Inert fillers are preferably high purity (greater than 99%) fillers and include without limitation metal oxides, such as $SiO_2$, $TiO_2$, $Al_2O_3$, ZnO, $SnO_2$, CaO, MgO; aluminum silicates and kaolins (clays), preferably calcined aluminum silicates and kaolins; $CaSO_4$, such as particles and/or whiskers, preferably calcined; and silicates such as wollastonite, talcs, borosilicate glass and synthetic calcined silicates of calcium and magnesium.

The inert fillers preferably have a particle size of less than about 30 microns in the longest direction. An inert filler preferably has an oil absorption number less than about 50, where oil absorption number is the ratio of grams of oil absorbed per 100 grams of filler.

In a preferred embodiment, the inert filler component comprises at least one of $SiO_2$, $CaSO_4$, $CaSO_4$ whiskers, $Al_2O_3$, and $TiO_2$. In a more preferred embodiment, the inert filler component comprises at least one of $SiO_2$, $TiO_2$, and $Al_2O_3$. $SiO_2$ is preferably fused (amorphous) silica, such as TECO 44C (available from C.E. Minerals, Greenville, Tenn.), which has a purity of at least 99.7% and a mean particle size of 6.5 microns. $CaSO_4$ is preferably calcined and in the form of particles, such as CAS-20-4 (available from U.S. Gypsum Corporation, Chicago, Ill.), which has a mean particle size of 4 microns and no particle size greater than 20 microns, or whiskers, such as Franklin Fiber H30 (available from U.S. Gypsum Corporation, Chicago, Ill.), which has dimensions of 2 microns in diameter and 30 microns average in length. $TiO_2$ preferably comprises a chloride process rutile type titanium dioxide, such as Tiona® RCL-4 (available from SMC Corp., Baltimore, Md.).

Small Particle Size Filler Component

The small particle size filler component comprises preferably between about 0.5 and about 5 weight percent of the composition, and even more preferably between about 1 and about 3 weight percent of the composition.

The small particle size filler component may comprise one or more fillers, provided that each filler has a mean particle size of preferably less than about 50 nanometers, more preferably, less than about 40 nanometers, and even more preferably less than about 30 nanometers. These fillers are preferably of high purity (99% or greater) and include $TiO_2$, $SiO_2$, $Al_2O_3$, and $Al_2SiO_3$. Preferably, these fillers have an oil absorption number less than about 30, where oil absorption number is the ratio of grams of oil per 100 grams of filler.

A highly preferred small particle size filler is $TiO_2$ P25 (available from Degussa Corporation, Pigment Group, Akron, Ohio), which has a mean particle size of about 20 nanometers and a $TiO_2$ assay of greater than 99.5%.

Optional Additives

Conventional additives may be added to compositions of the present invention and include without limitation one or more of reinforcing agents, pigments, dyes, antioxidants, lubricants, flame retardants, and colorants such as anthraquinone, direct dyes, para red, and the like. Preferred fillers and/or reinforcing agents include talc, glass flake, glass fiber, aramid fiber, and the like.

Preferred Applications

Compositions of our invention may be used alone as molding pellets or mixed with other polymers. The pellets may be used to produce fibers, films, and coatings as well as injection molded or extruded articles, particularly for electrical or electronic applications requiring excellent adhesion and low surface roughness in the finished articles, such as chip carriers, printed circuit boards, integrated circuits, encapsulated chips, and surface mount components.

Compositions of our invention preferably have excellent improved adhesion to other surfaces, e.g., metallized surfaces, and low surface roughness properties. Tests for measuring adhesion include simple peel tape tests (e.g., applying and removing, whether by manual or measured force, a tape to see if the skin surface separates from the inner skin layer of the LCP), and peel strength tests (e.g., determining the force or energy required to remove a second layer that has been adhered to the LCP). Tests for measuring surface roughness include visual inspection or inspection under magnification.

Preferred Methods of Preparation

The initial LCP compositions of the present invention may be prepared from the appropriate monomers, or precursors thereof, by standard polycondensation techniques (which can include either melt, solution, and/or solid phase polymerization), preferably under anhydrous conditions and in an inert atmosphere. For example, the requisite amounts of acetic anhydride, the diols, the hydroxybenzoic acid (or optionally the acetate/diacetate derivatives of the diols/hydroxybenzoic acid), and the diacids, and optionally up to 20 percent excess acetic anhydride, are combined in a reaction vessel equipped with a stirrer, nitrogen inlet tube, and combination distillation head/condenser (to facilitate by-product removal).

The reaction vessel and other equipment are dried and purged with nitrogen prior to use. The vessel and stirred contents, maintained under nitrogen, are heated during which time the ingredients react and any by-product formed (such as, for example, acetic acid) is removed via the distillation head/condenser and is collected. When the polymerization appears nearly complete, as indicated by the amount of by-product collected remaining constant, the molten mass is placed under reduced pressure (e.g. 1300 Pa(abs) or less) and is heated to a higher temperature, to facilitate removal of any remaining by-product and to complete the polymerization. Polymerization conditions may be varied according to, e.g., the reactants employed and the degree of polymerization desired.

The LCP melt may then be removed, cooled, and allowed to solidify prior to purification and/or subsequent processing such as melt compounding the liquid crystalline polyester composition with the inert fillers, small particle size fillers, and any other desired additives. Melt compounding can be accomplished by any device capable of mixing the molten liquid crystalline polyester and filler compositions, such as an extruder, either single or twin screw. It is important that the components are thoroughly blended together at an effective temperature at which the ingredients flux sufficiently for a uniform and maximum dispersion of the fillers in the LCP melt. Twin screw extruders may be either co-rotating or counter-rotating.

The compounded compositions may be cut into pellets for melt fabrication into a wide variety of articles by conventional processes such as extrusion and injection molding into such forms molded articles and films.

Optionally, the molten polymer along with the other components and additives may be transferred directly to an appropriate apparatus such as a melt extruder and/or injection molding machine or spinning unit, for the preparation of articles, such as molded and/or shaped electrical apparatuses. Again, the components should be thoroughly blended for maximum dispersions of the particulates.

EXAMPLES

The following Examples illustrate preferred embodiments. This invention is not limited to these Examples.

In the Examples, the following materials were used:

LCP: For Examples 1 and 2, the LCP polymer comprises 4,4'-diydroxybiphenyl/hydroquinone/terephthalic acid/2,6-napththalene dicarboxylic acid/4-hydroxybenzoic acid in a mole ratio of 50/50/85/15/320. For Examples 3, 5, and 6, the LCP polymer comprises 4,4'-diydroxybiphenyl/hydroquinone/terephthalic acid/2,6-napththalene dicarboxylic acid/4-hydroxybenzoic acid in a mole ratio of 50/50/87.5/12.5/320 and 10–30-ppm of alkali metal. For Example 4, the LCP polymer comprises both 4,4'-diydroxybiphenyl/hydroquinone/terephthalic acid/2,6-napththalene dicarboxylic acid/4-hydroxybenzoic acid in a mole ratio of 50/50/87.5/12.5/320 and 10–30-ppm of alkali metal, and 4,4'-diydroxybiphenyl/hydroquinone/terephthalic acid/2,6-napththalene dicarboxylic acid/4-hydroxybenzoic acid in a mole ratio of 50/50/70/30/320. In Example 7, the low melting LCP comprises hydroquinone/isophthalic acid/2,6-naphthalenedicarboxylic acid/4-hydroxybenzoic acid in a mole ratio of 100/70/30/270.

Inert filler: $CaSO_4$ is CAS-20-4; $TiO_2$ is Tiona® RCL-4; $SiO_2$ is TECO 44C; and $CaSO_4$ whiskers is Franklin Fiber H30.

Small particle size filler: $TiO_2$ is Degussa P-25.

The compositions of Examples 1–7 are set forth below in Table 1. All values are in parts by weight.

TABLE 1

| | Example | | | | | | |
|---|---|---|---|---|---|---|---|
| | 1 | 2 | 3 | 4 | 5 | 6 | 7 |
| LCP | 60 | 65 | 65 | 60* | 61 | 61 | 61 |
| Inert Filler | | | | | | | |
| $CaSO_4$ | — | 28 | 28 | 33 | — | — | — |
| $CaSO_4$ whiskers | 33 | — | — | — | — | — | — |
| $SiO_2$ | — | — | — | — | 31 | 31 | 31 |
| $TiO_2$ | 5 | 5 | 5 | 5 | 5.7 | 5.7 | 5.7 |
| Small Particle Size Filler | | | | | | | |
| $TiO_2$ | 2 | 2 | 2 | 2 | 2.3 | 2.3 | 2.3 |
| TOTAL | 100 | 100 | 100 | 100 | 100 | 100 | 100 |

*4 of the 60 parts comprises 4,4'-dihydroxybiphenyl/hydroquinone/terephthalic acid/2,6-napthhalene dicarboxylic acid/4-hydroxybenzoic acid in a mole ratio of 50/50/70/30/320; 56 of the 60 parts comprises 4,4'-dihydroxybiphenyl/hydroquinone/terephthalic acid/2,6-napthhalene dicarboxylic acid/4-hydroxybenzoic acid in a mole ratio of 50/50/87.5/12.5/320 and 10–30 ppm of alkali metal.

All of the compounds in the Examples were made on a 40 MM Werner and Pfleiderer ZSK twin screw extruder having a zone with conventional conveying elements, a zone with kneading or mixing elements, and a low pressure zone with venting under vacuum of any volatiles from the polymer melt and a die. In some of the Examples the extruder was fitted with a side stuffer to facilitate the addition of fillers. In Examples 2 and 3, the particulate $CaSO_4$ was added in the rear along with the other ingredients.

In Examples 2 and 3, the LCP (65 wt % of the total composition) was added to the rear zone. With a second feeder, particulate $CaSO_4$ (23 wt % of the total composition) was added to the rear zone. With a third feeder a preblend was made consisting of particulate $CaSO_4$ (5 wt % of the total composition, RCL4 rutile $TiO_2$ (5 wt % of the total composition) and Degussa P-25 nanometer $TiO_2$ (2 wt % of the total composition), and this preblend was added to the rear of the extruder.

Example 4 was made similarly to that of Examples 2 and 3, except that the LCP portion was a blend of two LCP's (see footnote * in Table 1) and the amount of particulate $CaSO_4$ added in the second feeder was increase by 5 wt % (to 28% of the total composition)

In Example 1, the LCP was added to the rear zone, and with a second feeder a preblend was added to the rear zone. The preblend was made as in Examples 2 and 4, but $CaSO_4$ whiskers were used in Example 1 instead of particulate $CaSO_4$. The rest of the $CaSO_4$ whiskers (28wt % of the total blend) was added via a side stuffer before the vacuum zone.

Examples 5 and 6 were duplicate runs made with TECO 44C fused silica. The LCP (61 wt % of the total composition) was rear fed in one feeder. A preblend consisting of TECO 44C fused silica (5% of the total composition), RCL4 rutile $TiO_2$ (5.7 wt % of the total composition) and Degussda P25 nanometer $TiO_2$ (2.7 wt % of the total composition) was added to the rear zone with a second feeder. The remainder of the silica (26 wt % of the total composition) was added via a side stuffer before the vaccum zone.

The barrel temperatures in Examples 1 to 6 were all set at 340° C. and a die temperature of 350° C. The total rate of the compounding was run at 200 lb/hr at a screw speed of 200 rpm's.

Example 7 was made with the same filler package and in the same mode of addition of the ingredients as in Examples 5 and 6, except the LCP resin was a low melting LCP. In this compounding example, the barrel temperatures were set at 250° C. and the die at 260° C. The screw speed and the rate was the same as in Examples 1 to 6.

As the compounded compositions exited the die, they were quenched with water spray and cut into pellets with a conventional strand cutter. Prior to injection molding, the pellets were dried overnight for approximately 16 hours at 150° C. The test specimens were molded on a 6 ounce HPM molding machine at barrel temperatures of 345° C. a nozzle temperatures of 350° C.–360° C. for Examples 1–6 and 275° C. for Example 7, a mold temperature of 110° C., and a screw speed of 120 rpm. The cycle time was 1.5 sec injection boost, 5 sec injection, 10–15 second hold. The injection boost pressures ranged from 8000 psi to 12000 psi and the hold pressure from 6000 psi to 10000 psi and the back pressure was set at 500 psi. The test bars were allowed to stand at room temperature for at least 16 hours before testing.

The following physical tests described herein were carried out on the examples according to the following procedures established by the American Society for Testing and Materials (ASTM):

Flexural Modulus and Flexural Strength—ASTM D-790.

Tensile strength and elongation was measured on 3.2 mm (⅛") thick tensile bars with a crosshead speed of 0.51 cm (0.2")/min according to ASTM D638-91. Strain gauges were used to accurately determine elongation.

DTUL (Heat Deflection Temperature)—ASTM D-648.

The results are displayed below in Table 2.

TABLE 2

| Example | Tensile Strength | Elongation | Flexural Strength | Flexural Modulus | DTUL |
|---|---|---|---|---|---|
| 1 | 18680 | 1.79 | 24800 | 2116000 | — |
| 2 | 17260 | 1.48 | 20680 | 1675000 | 267 |
| 3 | 17490 | 2.44 | 18350 | 1495000 | 266 |
| 4 | 17260 | 1.48 | 20680 | 1675000 | 267 |
| 5 | 17490 | 2.44 | 18350 | 1495000 | 266 |
| 6 | 17150 | 2.56 | 18940 | 1595000 | 267 |
| 7 | 14360 | 2.13 | 19500 | 1423000 | — |

While this invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent formulations and functions.

What is claimed is:

1. A composition comprising:

liquid crystalline polymer, in an amount between about 40 and about 85 weight percent of the composition;

an inert filler component, in an amount between about 15 and about 55 weight percent of the composition, wherein the inert filler has an average particle size of about 30 microns or less in the longest direction; and a small particle size filler component having a mean particle size of about 50 nanometers or less, in an amount between about 0.5 and about 5 weight percent of the composition, wherein the small particle size filler component is selected from $TiO_2$, $SiO_2$, $Al_2O_3$, or $Al_2SiO_3$.

2. The composition of claim 1, wherein said inert filler component comprises at least one of $SiO_2$, $CaSO_4$, $CaSO_4$ whiskers, $Al_2O_3$, or $TiO_2$.

3. The composition of claim 2, wherein said inert filler component comprises at least one of $SiO_2$, $TiO_2$, or $Al_2O_3$.

4. The composition of claim 3, wherein said $SiO_2$ comprises fused $SiO_2$.

5. The composition of claim 3, wherein said $TiO_2$ comprises a chloride process rutile $TiO_2$.

6. The composition of claim 1, wherein said small particle size filler component has a mean particle size of about 40 nanometers or less.

7. The composition of claim 1, wherein said small particle size filler component has a mean particle size of about 30 nanometers or less.

8. The composition of claim 1, wherein said small particle size filler component comprises titanium dioxide.

* * * * *